US011178007B1

(12) United States Patent
Belton, Jr. et al.

(10) Patent No.: US 11,178,007 B1
(45) Date of Patent: Nov. 16, 2021

(54) NETWORK SEGMENTATION

(71) Applicant: Wells Fargo Bank, N.A., San Francisco, CA (US)

(72) Inventors: Lawrence T. Belton, Jr., Charlotte, NC (US); Peter A. Makohon, Huntersville, NC (US); Robert I. Kirby, Charlotte, NC (US); Jonathan A. McNeill, Fleetwood, NC (US); Samantha Grosby, Minneapolis, MN (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 343 days.

(21) Appl. No.: 15/974,210

(22) Filed: May 8, 2018

Related U.S. Application Data

(60) Provisional application No. 62/619,467, filed on Jan. 19, 2018.

(51) Int. Cl.
*H04L 12/24* (2006.01)
*H04L 12/26* (2006.01)
*H04L 29/06* (2006.01)

(52) U.S. Cl.
CPC ........ *H04L 41/0816* (2013.01); *H04L 43/062* (2013.01); *H04L 43/16* (2013.01); *H04L 63/20* (2013.01)

(58) Field of Classification Search
None
See application file for complete search history.

(56) References Cited

U.S. PATENT DOCUMENTS

| 5,598,532 A * | 1/1997 | Liron .................. H04L 41/0826 370/254 |
| 2006/0095961 A1* | 5/2006 | Govindarajan ..... H04L 63/1416 726/15 |
| 2018/0255084 A1* | 9/2018 | Kotinas ................ G06K 9/6222 |

OTHER PUBLICATIONS

Dictionary.com "definition of the word segment." (Year: 2020).*

* cited by examiner

*Primary Examiner* — Angela Nguyen
(74) *Attorney, Agent, or Firm* — Kilpatrick Townsend & Stockton LLP (57) ABSTRACT

The innovation disclosed and claimed herein, in one aspect thereof, comprises systems and methods of determining network segmentation. The innovation can search a network to determine a set of network entities, the network entities belonging to the network, and determine network factors of each network entity in the set of network entities. The innovation can evaluate each network factor and determine segmentation candidates based on the evaluation of each network factor. The innovation can determine a risk ranking for each network factor for each network entity and aggregate each risk ranking into a segmentation score for each network entity. The innovation can determine a segmentation candidate when a network entity segmentation score satisfies a threshold score. The innovation can generate a sub-network that is part of the network for the segmentation candidate, and transfer the segmentation candidate to the sub-network.

20 Claims, 6 Drawing Sheets

NETWORK SEGMENTATION

CROSS-REFERENCE TO RELATED APPLICATION

This application claims the benefit of U.S. Provisional Patent Application Ser. No. 62/619,467 entitled "NETWORK SEGMENTATION" filed on Jan. 19, 2018. The entirety of the above-noted application is incorporated by reference herein.

BACKGROUND

Network security is increasingly important. Security assets are deployed on network systems to ensure malicious software, data packets, and/or traffic are detected for the network system before causing network interruptions or compromising important data. However, oftentimes, the security assets fail to protect the entirety of the network system. Network segmentation has shown to be useful in protecting critical sectors of a network such that network failures or compromised sub-networks are self-contained to prevent cross movement to other parts of the network. However, it is difficult to determine suitable segmentation candidates out of network entities. It can be useful to determine the best segmentation candidates from a set of network entities existing on a larger network.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of network segmentation. A method can include analyzing a network for a set of network entities. The analyzing results in a set of network entities having network factors. The method includes identifying at least one segmentation candidate based on the analysis of the set of network entities. The identifying analyzes the network factors and computes a segmentation score for each network entity. The method includes segmenting the segmentation candidate into a sub-network based on the identification and the segmentation score meeting a threshold segmentation score. The segmentation includes changing network settings of the segmentation candidate such that is resides on a sub-network isolated from the overall network.

A system of the innovation can include an analysis component that analyzes a network for a set of network entities. The analyzing results in a set of network entities having network factors. The system includes an identification component that identifies at least one segmentation candidate based on the analysis of the set of network entities. The identifying analyzes the network factors and computes a segmentation score for each network entity. The system includes a segmentation component that segments the segmentation candidate into a sub-network based on the identification and the segmentation score meeting a threshold segmentation score. The segmentation includes changing network settings of the segmentation candidate such that is resides on a sub-network isolated from the overall network.

A computer readable medium of the innovation has instructions to control one or more processors configured to search a network to determine a set of network entities, the network entities belonging to the network. and determine network factors of each network entity in the set of network entities. The instructions can evaluate each network factor for each network entity, and determine segmentation candidates based on the evaluation of each network factor. The instructions can determine a risk ranking for each network factor for each network entity, and aggregate each risk ranking into a segmentation score for each network entity. The instructions can determine a segmentation candidate when a network entity segmentation score satisfies a threshold score. The instructions can generate a sub-network that is part of the network for the segmentation candidate, and transfer the segmentation candidate to the sub-network.

In aspects, the subject innovation provides substantial benefits in terms of network security and segmentation. One advantage resides in automatically identifying good network entities for segmentation. Another advantage resides in increased security from a more segmented network.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 1:
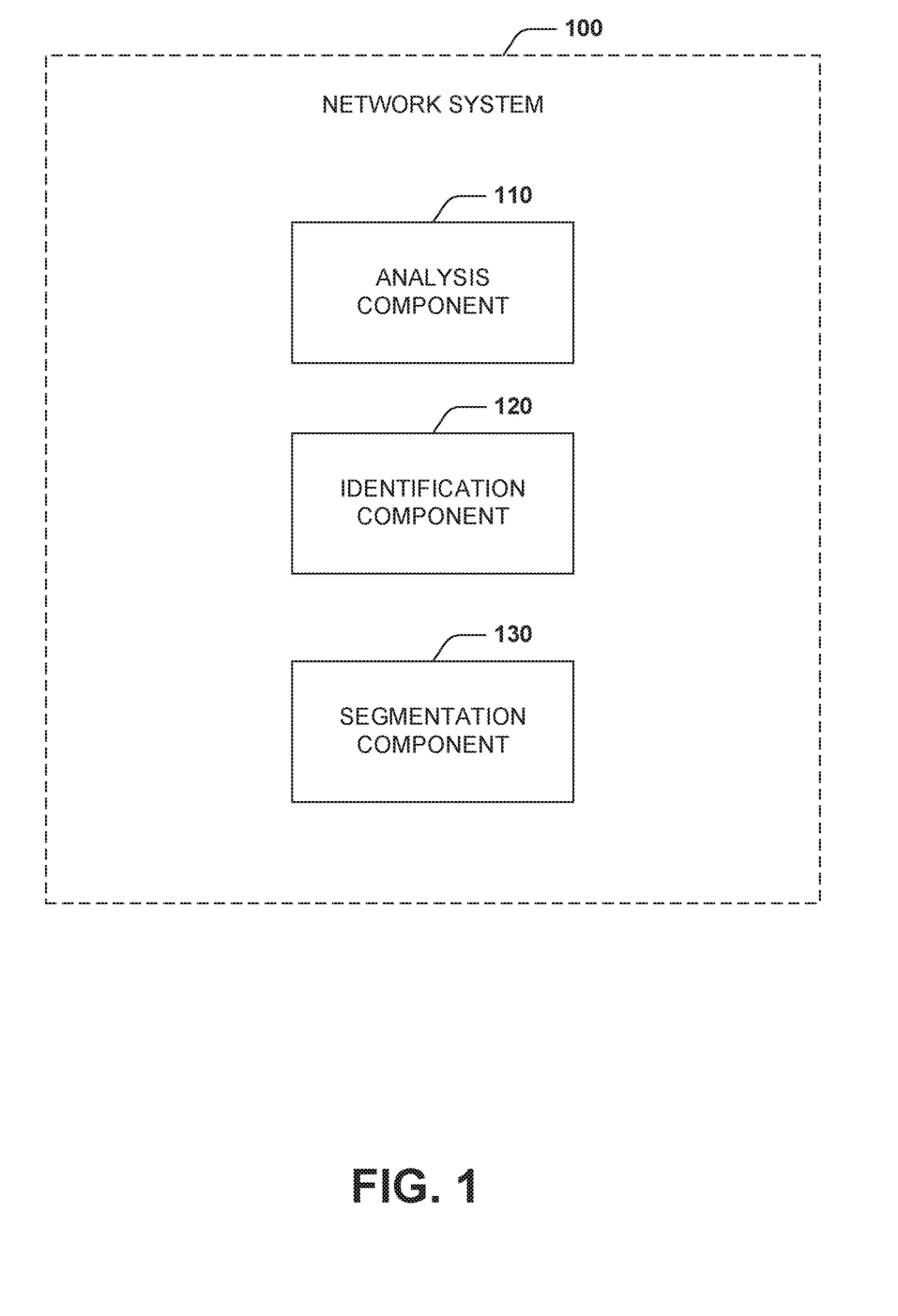
FIG. 1 illustrates an example component diagram of a network system of the present innovation.

FIG. 1 illustrates a network system 100 for determining network segmentation. The network system 100 includes an analysis component 110. The analysis component 110 analyzes or scans a network for network entities. The network can belong to a company or other type of business and/or the like. The network connects computers, handheld devices, and/or the like to the network to provide services, information, websites, and/or the like.

The analysis component 110 searches the network to determine the network entities that belong to the network. For example, the analysis component 110 can compile a list of applications that reside on the network. The applications can be for outside customer accounts, employee applications, vendor or third party assets, systems that have not met security standards, systems with regulatory or contractual requirements, and/or the like. The analysis component 110 stores the list of network entities or applications to be identified for segmentation.

The analysis component 110 analyzes each found network entity for network factors. The network factors are statistics or attributes about the network entity that affects whether the network entity is a good candidate for segmentation. The network factors can include the nature of network entity, seed information, network logs, complexity across the network, nature of the traffic, load balancing, and/or the like. For example, the nature of the network can be whether the network entity is a high risk for fraud loss such as a credit card application system or automated teller machine network application. As another example, the nature of the traffic can be the amount of network traffic that originates from outside the network versus traffic that is from within other parts of the network.

The network system 100 includes an identification component 120 that identifies segmentation candidates from the list based on the analyzed network entities and their associated network factors. The identification component 120 evaluates each network factor for each network entity. The identification component 120 determines a risk ranking for each network factor for each network entity. In some embodiments, the risk ranking for each network factor can be an analog ranking in comparison to other network entities. In other embodiments, the risk ranking is computed based on analyzed metrics of each network factor by the analysis component 110. For example, the risk ranking can be based on amount of traffic coming through the network entity. The higher the amount of traffic, the higher the risk ranking due to an implied increased importance or criticality of the network entity.

The identification component 120 aggregates each risk ranking into a segmentation score for each network entity. The identification component 120 aggregates the risk ranking of each network factor into a segmentation score associated with the network entity. In some embodiments, the identification component 120 can normalize the risk ranking of each network factor for a network entity and then average, or weighted average each network factor into an overall segmentation score. In other embodiments, the identification component 120 can weight each network factor by number of instances or occurrences determined by the analysis component 110. For example, the number of instances of fraud in comparison to the total number of instances overall determines the weight of the fraud potential network factor.

In some embodiments, the identification component 120 compares each segmentation score to a threshold score. If the segmentation score is greater than the predetermined threshold score, the network entity is determined to be a segmentation candidate. A segmentation candidate is a network entity that is identified as potentially being a good entity for segmentation based on the network factors.

The network system 100 includes a segmentation component 130 that segments segmentation candidates into sub-networks. The segmentation component 130 receives the segmentation candidates from the identification component. The segmentation candidate 130 generates a sub-network for each segmentation candidate that is part of the network. The sub-network operates as a separate network with its own lines of communication within it and lines of communication to outside networks. The sub-network remains associated with the larger network.

The segmentation component 130 transfers the segmentation candidate to the sub-network. The segmentation component 130 implements the transfer by changing network settings of the network entity marked as a segmentation candidate such that the network settings indicate generated sub-network settings instead of original network settings. The segmentation component 130 can implement the changes to each segmentation candidate such that the network includes many isolated sub-networks.

Figure 2:
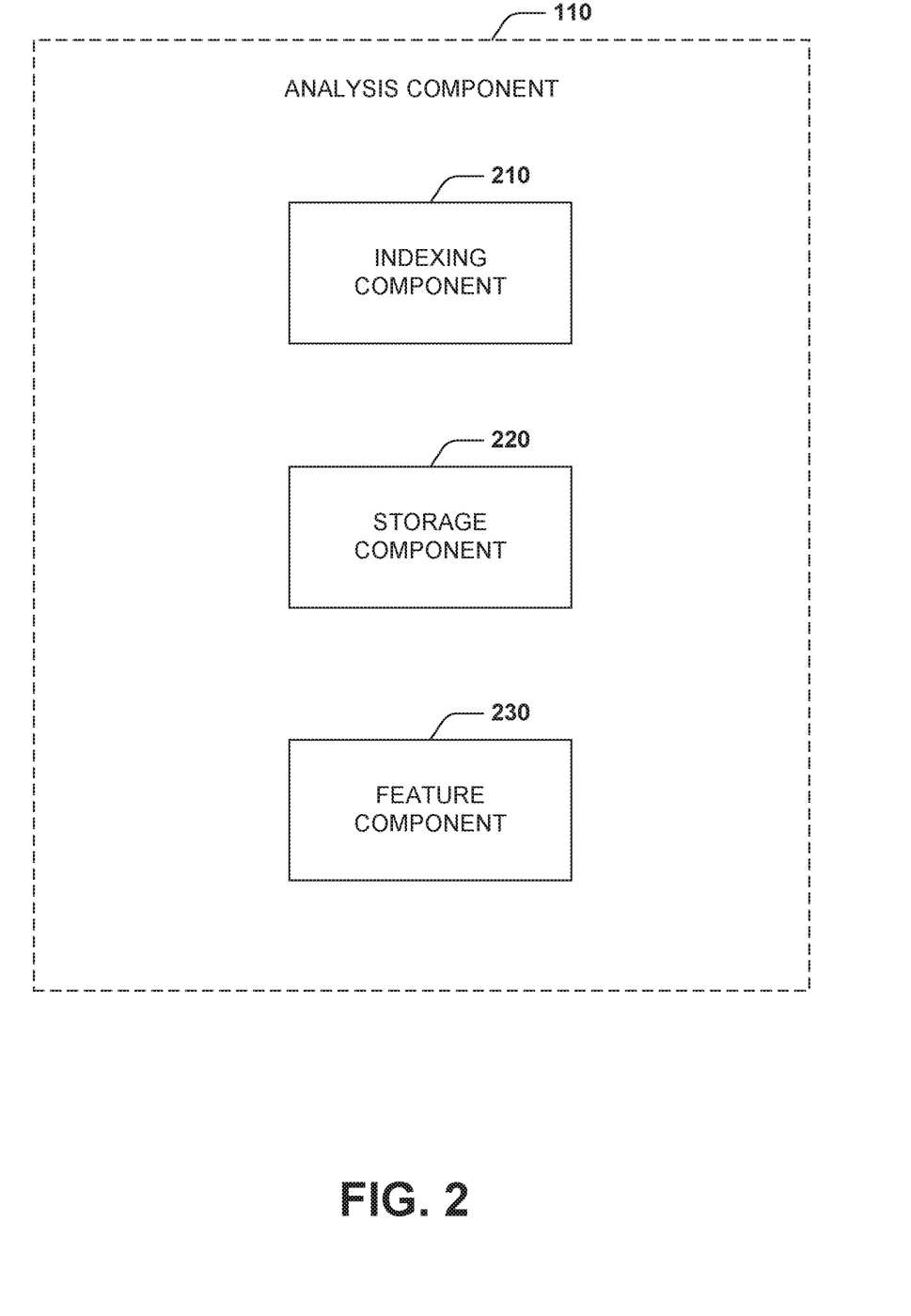
FIG. 2 illustrates an example component diagram of an analysis component.

FIG. 2 illustrates a detailed component diagram of the analysis component 110. The analysis component 110 includes an indexing component 210. The indexing component 210 analyzes or scans a network for network entities. The indexing component 210 searches the network to determine the network entities that belong to the network. For example, the indexing component 210 can compile an index or list of applications or systems that reside on the network. The applications can be for outside customer accounts, employee applications, vendor or third party assets, systems that have not met security standards, systems with regulatory or contractual requirements, and/or the like. For example, a system that can reside on the network can be a credit card payment processing system. The indexing component 210 stores the list of network entities or applications to be identified for segmentation on a storage component 220.

The analysis component 110 includes a feature component 230. The feature component 230 analyzes each found network entity for network factors. The network factors are statistics or attributes about the network entity that affects whether the network entity is a good candidate for segmentation. The network factors can include the nature of network entity, seed information, network logs, complexity across the network, nature of the traffic, load balancing, and/or the like. For example, the nature of the network can be whether the network entity is a high risk for fraud loss such as a credit card application system or automated teller machine network system. In another example, the nature of the traffic can be the amount of network traffic that originates from outside the network versus traffic that is from within other parts of the network. Further examples are provided below.

Figure 3:
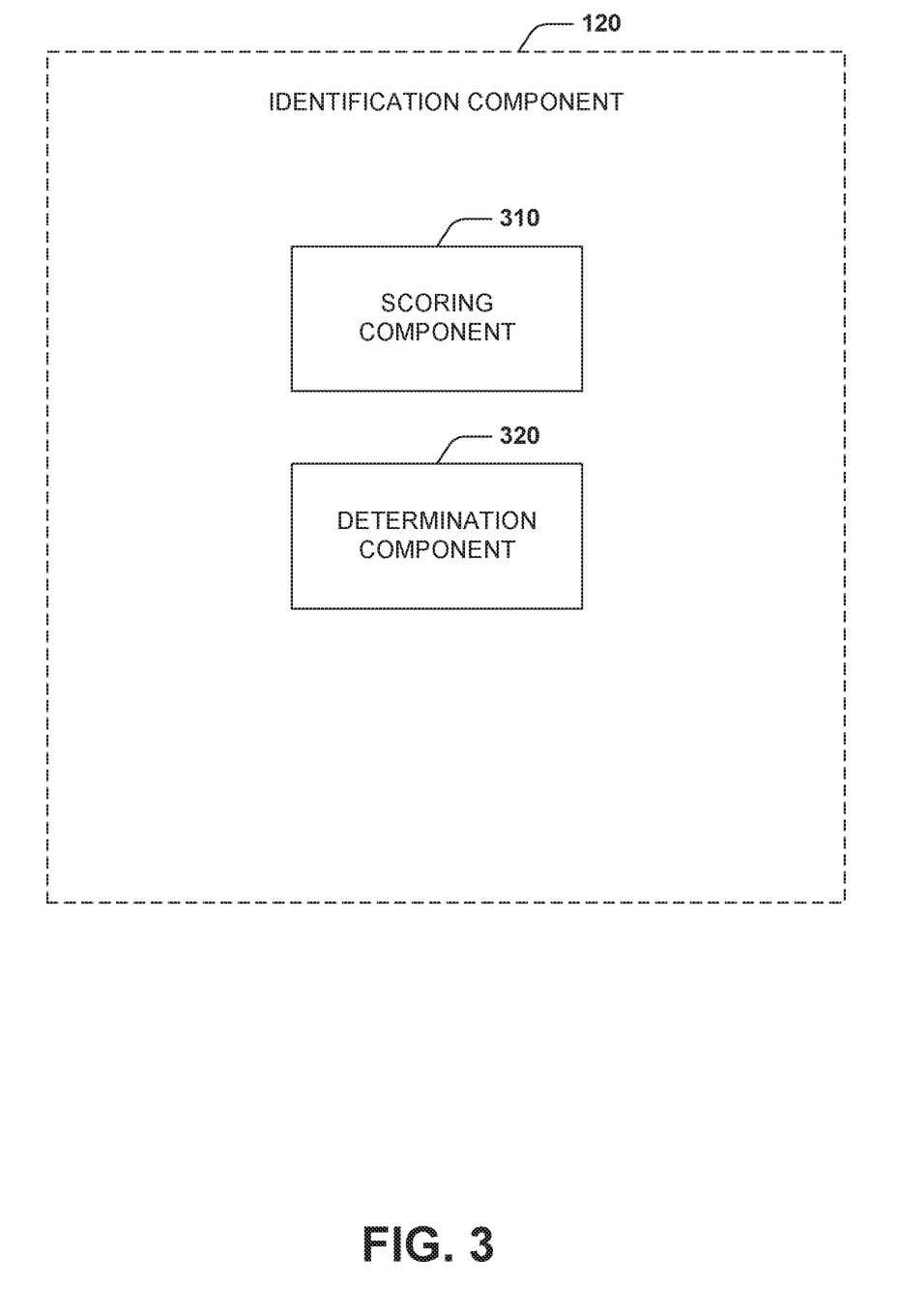
FIG. 3 illustrates an example component diagram of an identification component.

FIG. 3 illustrates a component diagram of an identification component 120. The identification component 120 identifies segmentation candidates from the network entity list based on the analyzed network entities and their associated network factors. The identification component 120 includes a scoring component 310 that evaluates each network factor for each network entity. The scoring component 310 calculates or determines a risk ranking for each network factor for each network entity. In some embodiments, the risk ranking for each network factor can be an analog ranking provided by a network administrator. In other embodiments, the risk ranking is computed based on analyzed metrics of each network factor by the analysis component 110. For example, the risk ranking can be based on amount of traffic coming through the network entity. The higher the amount of traffic, the higher the risk ranking due to an implied increased importance or criticality of the network entity.

The scoring component 310 aggregates each risk ranking of a network entity into a segmentation score for each network entity. The scoring component 310 aggregates the risk ranking of each network factor into a segmentation score associated with the network entity. In some embodiments, the scoring component 310 can normalize the risk ranking of each network factor for a network entity and then average, or weighted average each network factor into an overall segmentation score.

The identification component 120 includes a determination component 320. The determination component 320 compares each segmentation score to a threshold score. If the segmentation score is greater than the predetermined threshold score, the determination component determines the network entity is a segmentation candidate. The segmentation candidate is a network entity that is identified as potentially being a good entity for segmentation based on the network factors. A segmentation candidate has the risk rankings and segmentation score that indicate the network entity should be segmented into its own sub-network from the larger network.

Examples of good segmentation candidates can be an application-service with a network factor risk ranking of high potential to impact large populations of users and/or other systems or high customer visibility. In another example, a network entity with a high ranking of fraud loss potential network factor is a segmentation candidate. In another example, network entities that are source code repositories and/or single source with the ability to control, change, or access many destinations are segmentation candidates. A network entity that is single control which if compromised can result in significant operational/availability risk or a single source that aggregates confidential configuration data from multiple sources are segmentation candidates.

Other segmentation candidates can include: systems, particularly those that are third party managed, which are not configured with integrated, layered security management controls; network entities that are in high risk physical locations; systems with high-risk intellectual property; physically unsecured assets/assets that can be directly physically accessed by a third party; systems which are unable to meet company security standards for self-defense, patching, or layered controls; systems with specific regulatory or contractual requirements for segmentation; separate lower environments with lax security from higher environments with greater security requirements; and/or the like.

Figure 4:
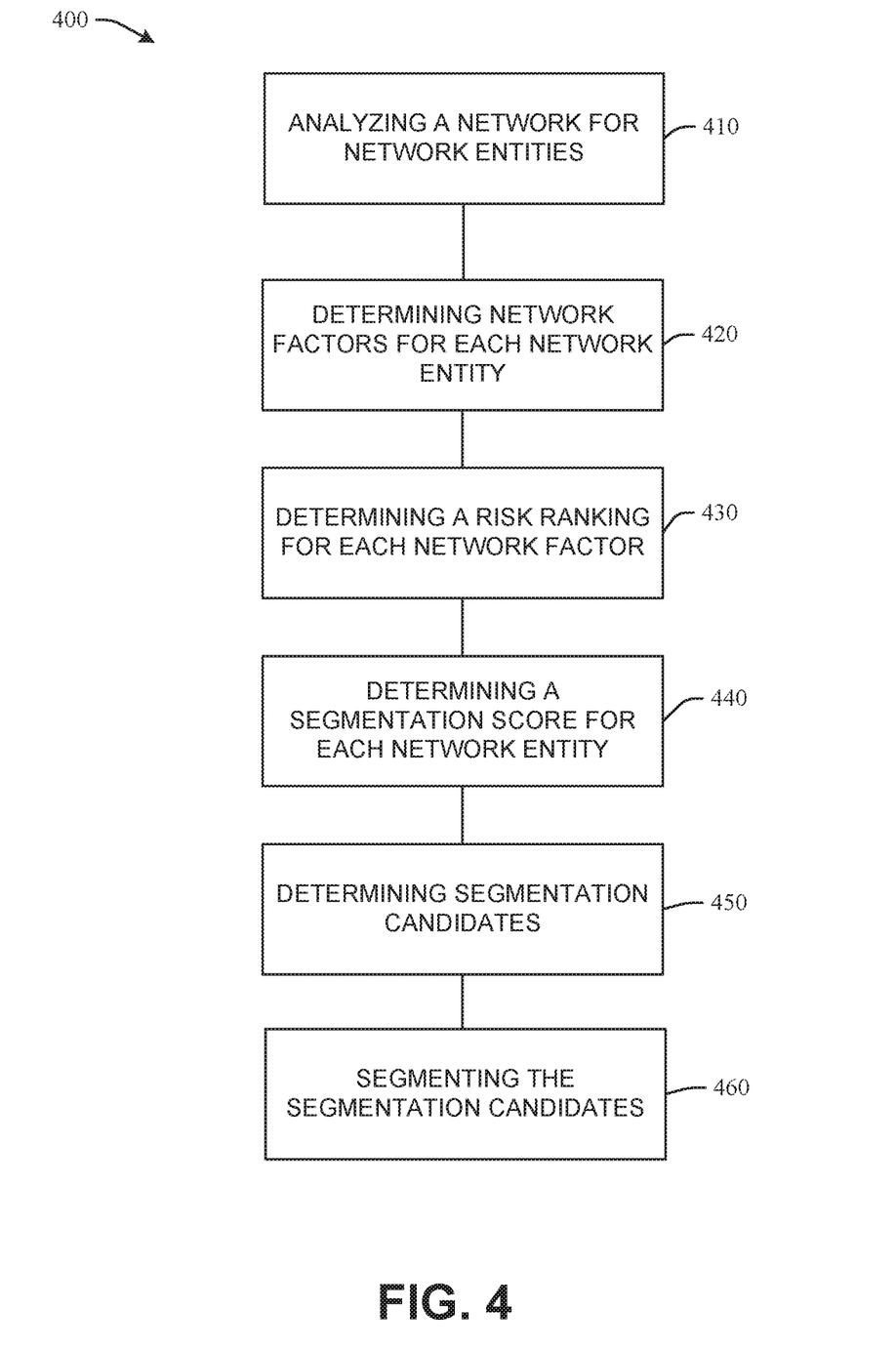
FIG. 4 illustrates a method for network segmentation.

With reference to FIG. 4, example method 400 is depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 can be described in conjunction with a specific example is for explanation purposes.

FIG. 4 illustrates a method 400 for determining network segmentation. The method 400 can begin at 410, a network is analyzed for a network entities residing on the network. The analyzing results in a set of network entities having network factors. At 420, network factors of each network entity are determined. At 430, a risk ranking is determined for each network factor for each network entity. At 440, the risk rankings are aggregated into a segmentation score for each network entity. At 450, segmentation candidates are determined based on the segmentation score of each network entity. The determination can be based on the segmentation score meeting a threshold segmentation score. At 460, the segmentation candidate is segmented into a sub-network based on the identification. The segmentation can include changing network settings of the segmentation candidate such that is resides on a sub-network isolated from the overall network.

Figure 5:
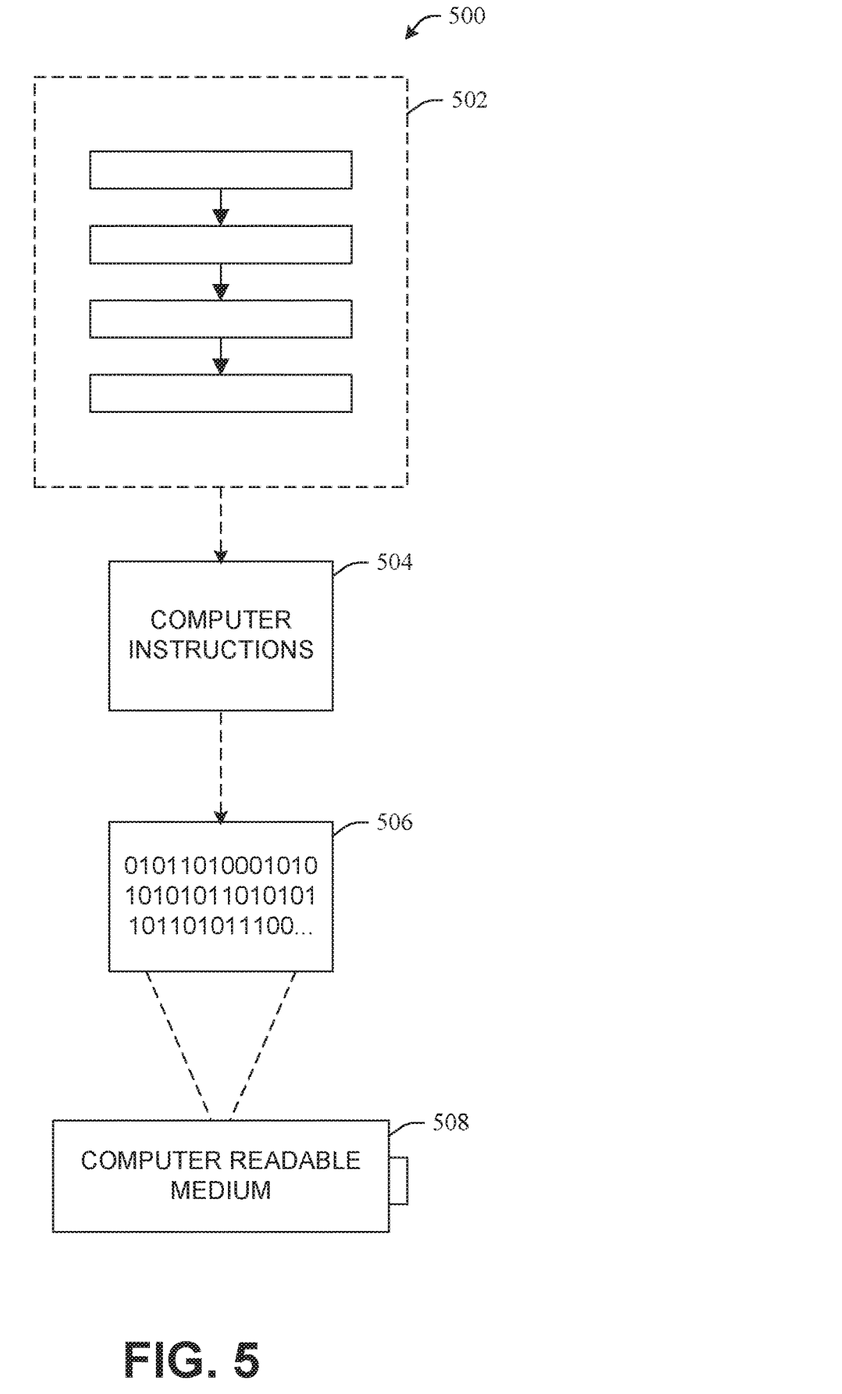
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
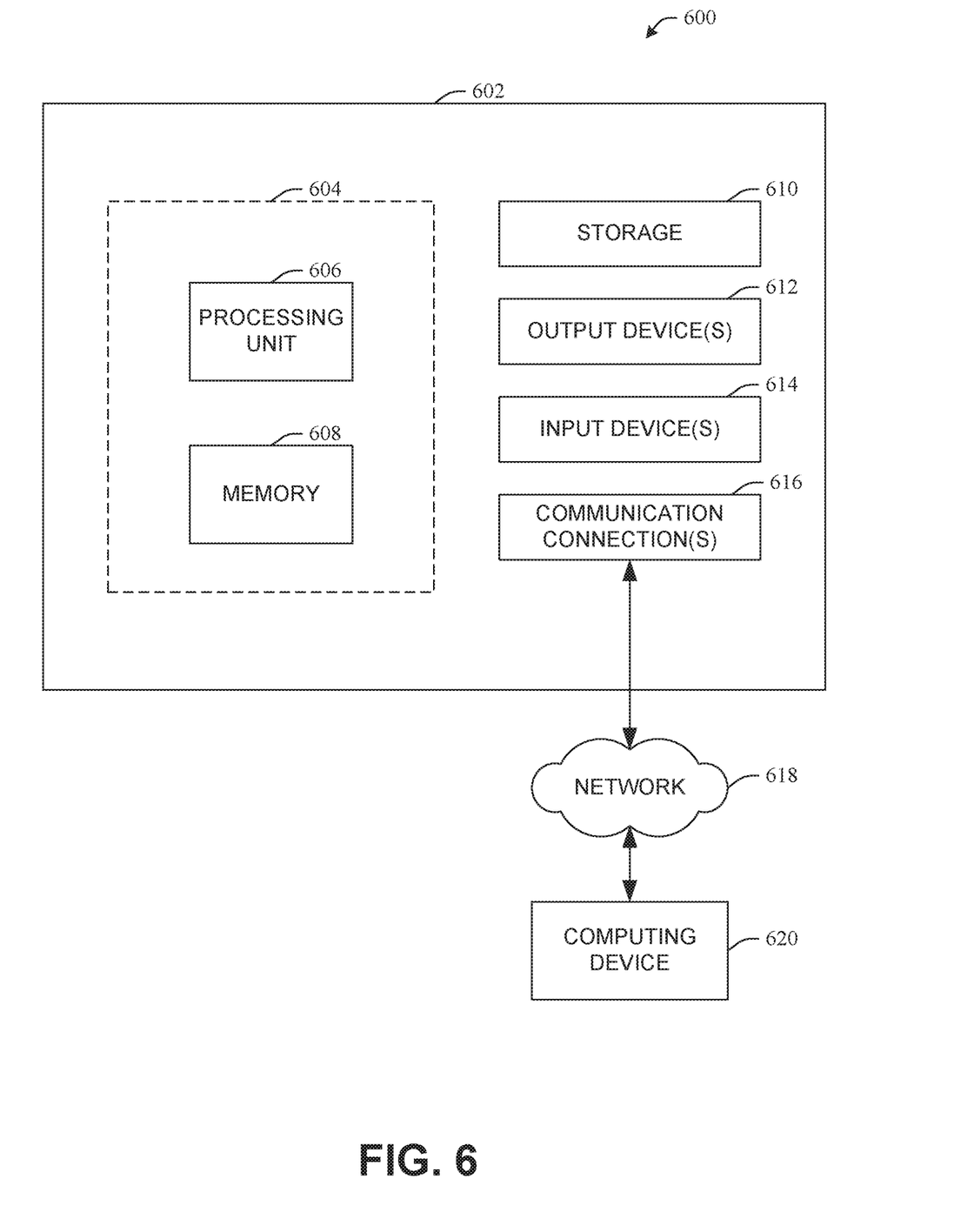
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   analyzing a network for a set of network entities;
   determining and storing network factors of the set of network entities, wherein the network factors include a nature of network entity, seed information, network logs, complexity across the network, nature of traffic, and load balancing;
   identifying at least one segmentation candidate based on the analyzing of the set of network entities and the network factors; and
   segmenting the segmentation candidate into a sub-network based on the identification, the segmenting comprising:
   generating the sub-network that is an isolated part of the network for the segmentation candidate; and
   transferring the segmentation candidate to the sub-network such that the segmentation candidate is isolated from the network.

2. The method of claim 1, the analyzing comprising:
   searching the network to determine the set of network entities, the set of network entities belonging to the network; and
   storing the set of network entities.

3. The method of claim 1, the identifying comprising:
evaluating the network factors for the set of network entities; and
determining segmentation candidates based on the evaluation of the network factors.

4. The method of claim 3, the evaluating comprising:
determining a risk ranking for each network factor for each network entity; and
aggregating each risk ranking into a segmentation score for each network entity.

5. The method of claim 4, the aggregation comprising:
weighting each risk ranking according to weighting values to determine the segmentation score.

6. The method of claim 4, comprising:
comparing each segmentation score to a threshold score representing the minimum segmentation candidacy; and
segmenting the segmentation candidate when the segmentation score satisfies the threshold score.

7. The method of claim 3, the determining the segmentation candidate comprising:
determining a segmentation score for the set of network entities based on the network factors, wherein the segmentation score measures suitability of segmentation.

8. The method of claim 7, comprising:
wherein the segmentation candidate is a single control network entity, a source code repository, or a third party managed network entity.

9. A system, comprising:
an analysis component that analyzes a network for a set of network entities;
a feature component that determines and stores network factors of the set of network entities, wherein the network factors include a nature of network entity, seed information, network logs, complexity across the network, nature of traffic, and load balancing;
an identification component that identifies at least one segmentation candidate based on the analysis of the set of network entities; and
a segmentation component that segments the segmentation candidate into a sub-network based on the identification, wherein the segmentation component changes an original set of network settings of the network into a sub-network set of settings for the segmentation candidate.

10. The system of claim 9, the analysis component comprising:
an indexing component that searches the network to determine the set of network entities, the set of network entities belonging to the network; and
a storage component that stores the set of network entities in a database.

11. The system of claim 9, the identification component comprising:
a scoring component that evaluates the network factors for the set of network entities; and
a determination component that determines segmentation candidates based on the evaluation of the network factors.

12. The system of claim 11, the identification component comprising:
wherein the scoring component:
computes a risk ranking for each network factor for each network entity; and
aggregates each risk ranking into a segmentation score for each network entity.

13. The system of claim 12, comprising:
wherein the scoring component weights each risk ranking according to weighting values to determine the segmentation score.

14. The system of claim 12, comprising:
wherein the determination component:
compares each segmentation score to a threshold score representing the minimum segmentation candidacy; and
segment the segmentation candidate when the segmentation score satisfies the threshold score.

15. The system of claim 9, comprising:
wherein the segmentation component:
generates a sub-network that is an isolated part of the network for the segmentation candidate; and
transfers the segmentation candidate to the sub-network such that the segmentation candidate is isolated from the network.

16. The system of claim 11, comprising:
wherein the scoring component determines a segmentation score for the set of network entities based on the network factors, wherein the segmentation score measures suitability of segmentation.

17. A non-transitory computer readable medium having instructions to control one or more processors configured to:
search a network to determine a set of network entities, the network entities belonging to the network;
determine network factors of the set of network entities;
evaluate the network factors for the set of network entities, wherein the network factors include nature of network entity, seed information, network logs, complexity across the network, nature of network traffic, and load balancing;
determine segmentation candidates based on the evaluation of the network factors;
determine a risk ranking for the network factors for the set of network entities;
aggregate the risk rankings into a segmentation score for network entities in the set of network entities;
determine a segmentation candidate when a segmentation score satisfies a threshold score;
generate a sub-network that is an isolated part of the network for the segmentation candidate; and
transfer the segmentation candidate to the sub-network such that the segmentation candidate is isolated from the network.

18. The non-transitory computer readable medium of claim 17, wherein the segmentation score measures suitability of segmentation.

19. The non-transitory computer readable medium of claim 17, comprising:
wherein the segmentation candidate is a single control network entity, a source code repository, or a third party managed network entity.

20. The system of claim 16, comprising:
wherein the segmentation candidate is a single control network entity, a source code repository, or a third party managed network entity.

* * * * *